US007310013B2

(12) United States Patent
Porter

(10) Patent No.: US 7,310,013 B2
(45) Date of Patent: *Dec. 18, 2007

(54) METHOD, APPARATUS, AND SYSTEM FOR LOW VOLTAGE TEMPERATURE SENSING

(75) Inventor: J. David Porter, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/495,233

(22) Filed: Jul. 28, 2006

(65) Prior Publication Data

US 2006/0267668 A1 Nov. 30, 2006

Related U.S. Application Data

(63) Continuation of application No. 10/931,831, filed on Aug. 31, 2004, now Pat. No. 7,084,695.

(51) Int. Cl.
*H01L 35/00* (2006.01)

(52) U.S. Cl. .................... 327/512; 374/176

(58) Field of Classification Search ........ 327/512–513, 327/509; 374/173, 176
See application file for complete search history.

(56) References Cited

U.S. PATENT DOCUMENTS

| 5,095,227 | A | 3/1992 | Jeong |
| 5,195,827 | A | 3/1993 | Audy et al. |
| 5,519,354 | A | 5/1996 | Audy |
| 5,841,996 | A | 11/1998 | Nolan et al. |
| 5,993,060 | A | 11/1999 | Sakurai |
| 6,008,685 | A | 12/1999 | Kunst |

(Continued)

FOREIGN PATENT DOCUMENTS

EP    0 999 435 A2    5/2000

(Continued)

OTHER PUBLICATIONS

Sim et al., Double Boosting Pum, Hyygrid Current Sense Aplifier, and Binary Weighted Temperature Sensor Adjustment Schemes for 1.8V 128 Mb Mobile Drams, 2002 Symposium on VLSI Circuits Digest of Technical Papers, pp. 294-297, Samsung Electronics, Korea.

(Continued)

*Primary Examiner*—Dinh T. Le
(74) *Attorney, Agent, or Firm*—TraskBritt

(57) ABSTRACT

A temperature sensor device and method of sensing temperature are disclosed. The device and method include generating a reference voltage inversely correlated to the temperature, generating a plurality of analysis voltages correlated to the temperature using a reference current, comparing the reference voltage to each of the plurality of analysis voltages, and generating a temperature estimate based on the comparison. The device and method may also include a method to selectively bypass various resistors in a resistor stack used to generate the various analysis voltages. Another embodiment of the present invention comprises a semiconductor device including at least one temperature sensor according to the invention described herein. The temperature sensor and method of sensing temperature may be incorporated into a semiconductor device, which may be fabricated on a semiconductor wafer and included in an electronic system.

29 Claims, 6 Drawing Sheets

U.S. PATENT DOCUMENTS

| | | |
|---|---|---|
| 6,047,380 A | 4/2000 | Nolan et al. |
| 6,048,094 A | 4/2000 | Tornare |
| 6,137,341 A | 10/2000 | Friedman et al. |
| 6,232,618 B1 | 5/2001 | Wienand et al. |
| 6,554,469 B1 | 4/2003 | Thomson et al. |
| 2001/0004238 A1 | 6/2001 | Lekomiller et al. |
| 2004/0059538 A1 | 3/2004 | Fulton et al. |

FOREIGN PATENT DOCUMENTS

| | | |
|---|---|---|
| WO | WO 91/06839 | 5/1991 |

OTHER PUBLICATIONS

Low-Power Analog Temperature Sensor in SC70 Package, Maxim Integrated Products, 2000, pp. 3-5.

Low-Voltage Analog Temperature Sensor in an SC70 Package, Maxim Integrated Products, 2000, pp. 1-6.

Bianchi et al., CMOS Compatible Temperature Sensor Based on the Lateral Bipolar Transistor for Very Wide Temperature Range Applications, Sensors and Actuators A 71, 1998 Elsevier Science S.A. France, pp. 3-9.

Bianchi et al., CMOS-Compatable Smart Temperature Sensors, Microelectronics Journal 29, 1998 Elsevier Science S.A. France, pp. 627-636.

Ferri et al., Noise Considerations in Low Voltage CMOS Integrated Temperature Sensors, Sensors and Actuators 85, 2000 Elsevier Science S.A. France, pp. 232-238.

Wang et al., The Temperature Characteristics of Bipolar Transisters Fabricated in CMOS Technology. Sensors ad Actuators 87, 2000 Elsevier Science S.A. France, pp. 81-89.

Stanescu, A New Architecture for Low Voltage Temperature Sensors, Semiconductor Conference, 1998 CAS' 98 Proceedings, 1998 International, 1 page.

METHOD, APPARATUS, AND SYSTEM FOR LOW VOLTAGE TEMPERATURE SENSING

CROSS-REFERENCE TO RELATED APPLICATION

This application is a continuation of application Ser. No. 10/931,831, filed Aug. 31, 2004, now U.S. Pat. No. 7,084,695, issued Aug. 1, 2006.

BACKGROUND OF THE INVENTION

1. Field of the Invention

This invention relates generally to temperature sensors, and particularly to determining various temperature points using a reduced voltage.

2. Description of Related Art

In modern high frequency integrated circuits, operating temperature has become increasingly important. Power consumption and device temperatures may generally be related to clock frequency and the number of nodes on a semiconductor device toggling at these high frequencies. The increased toggling frequencies generate additional heat, which may cause a semiconductor device to reach very high temperatures. Generally, devices are specified to operate in a certain temperature range within which the device has been characterized. Temperature sensors on these devices may be useful to control the operational parameters of the device. For example, if the temperature of the device rises above a temperature threshold, operation of the device may be modified to reduce heat generation until the temperature of the device falls below a temperature threshold. Once the lower temperature threshold is met, the operating parameters may be returned to their previous values. A variety of operating parameters may be modified to reduce the temperature. For example, a device may reduce its clock rate for all or portions of the device, or it may implement low power modes of various analog circuits to reduce heat generation. Other examples include reducing the refresh rate of Dynamic Random Access Memory (DRAM) and adjusting the impedance of output devices. Additionally, the device may report its current temperature to other devices in a system for overall system temperature monitoring and control.

Many circuit devices such as resistors, diodes, and transistors have operating characteristics that vary as temperature varies. These characteristics may be used to sense ambient temperature near these devices. Many different configurations of temperature sensors may be devised to take advantage of these characteristics.

Some temperature sensors take advantage of these varying characteristics by applying a voltage across a resistor or a diode. The resulting analog voltage may then be sampled using an analog-to-digital converter to arrive at a temperature estimate. However, these types of sensors may be complex and not be able to sense temperatures over a wide range.

Other temperature sensors may use two similar current sources to generate a current flowing through a diode and a current flowing through a resistor. The respective voltage drops produced by the current flowing through the diode and the current flowing through the resistor are compared in order to determine whether the present temperature is above or below a certain temperature. However, there may be a need for defining a variety of temperature points.

As a result, there is a need for a temperature sensor that can operate at lower voltages while allowing a variety of temperature sensing thresholds for communication to other devices on a semiconductor device or within a system.

BRIEF SUMMARY OF THE INVENTION

The present invention enables simple temperature sensing at a variety of temperatures and at lower voltages. An embodiment of the present invention comprises a temperature sensor including a reference module, a resistor stack, a plurality of analysis signals connected to the resistor stack, an analog multiplexer, a comparator, and a controller. The reference module may be configured for generating a reference voltage inversely correlated to a temperature. The resistor stack includes a plurality of resistors operably coupled in series between a reference current and a base signal, wherein each analysis signal comprises a voltage drop across at least one of the resistors in the resistor stack. The analog multiplexer may be configured for operably coupling each of the plurality of analysis signals to a multiplexer output based on a multiplexer control signal. The comparator may be configured for comparing the multiplexer output to the reference voltage to generate a comparison result, which the controller may analyze to generate, among other things, the multiplexer control signal. Other embodiments may include a bypass module for selectively bypassing at least one of the plurality of resistors in the resistor stack in response to a bypass control signal generated by the controller.

Another embodiment of the present invention comprises a method of sensing a temperature, comprising generating a reference voltage inversely correlated to the temperature, generating a plurality of analysis voltages correlated to the temperature using a reference current, comparing the reference voltage to each of the plurality of analysis voltages, and generating a temperature estimate based on the comparison. Other embodiments may include using a plurality of resistors to generate the plurality of analysis voltages and selectively bypassing at least one of the plurality of resistors when performing the comparison to the reference voltage.

Another embodiment of the present invention comprises a method of reducing an operational supply voltage needed for sensing a temperature. The method comprises generating a reference voltage inversely correlated to the temperature and, generating a plurality of analysis voltages correlated to the temperature using a reference current derived from the operational supply voltage. The plurality of analysis voltages are derived from a resistor stack comprising a plurality of resistors operably coupled in series. The method further comprises reducing the operational supply voltage by selectively bypassing at least one of the resistors in the resistor stack, comparing the reference voltage to each of the plurality of analysis voltages, and generating a temperature estimate based on the comparison.

Another embodiment of the present invention comprises a semiconductor device including at least one temperature sensor according to the invention described herein.

Another embodiment of the present invention comprises at least one semiconductor device including at least one temperature sensor according to the present invention fabricated on a semiconductor wafer.

Yet another embodiment in accordance with the present invention comprises an electronic system including at least one input device, at least one output device, at least one processor, and at least one memory device. The at least one memory device comprises at least one semiconductor memory incorporating at least one temperature sensor according to the present invention.

BRIEF DESCRIPTION OF THE DRAWINGS

In the drawings, which illustrate what is currently considered to be the best mode for carrying out the invention.

DETAILED DESCRIPTION OF THE INVENTION

In the following description, circuits and functions may be shown in block diagram form in order not to obscure the present invention in unnecessary detail. Conversely, specific circuit implementations shown and described are exemplary only, and should not be construed as the only way to implement the present invention unless otherwise specified herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted inasmuch as such details are not necessary to obtain a complete understanding of the present invention and are within the abilities of persons of ordinary skill in the relevant art.

The term "bus" is used to refer to a plurality of signals or conductors, which may be used to transfer one or more various types of information, such as data, addresses, control, or status. Additionally, a bus or a collection of signals may be referred to in the singular as a signal.

Figure 1:
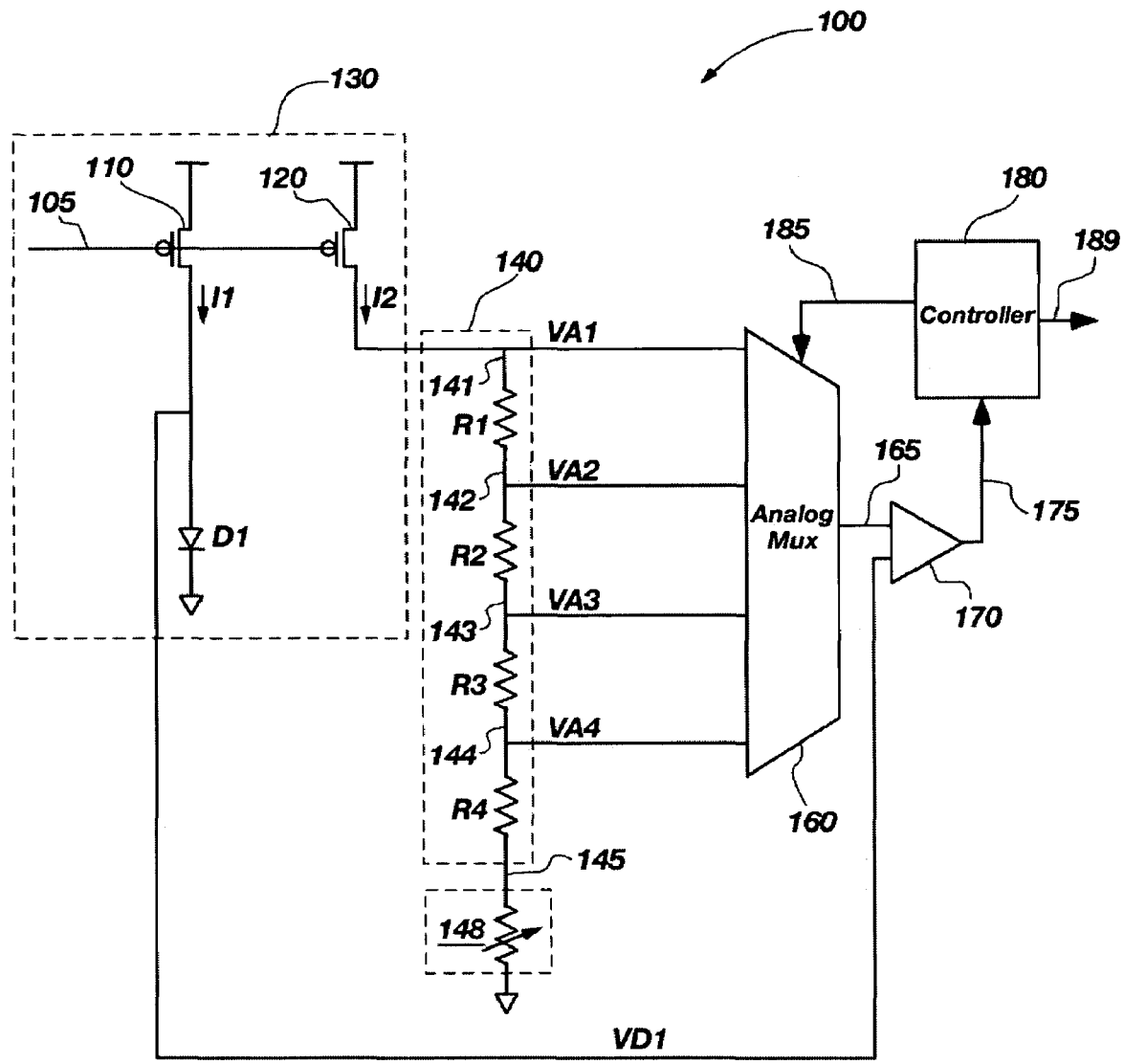
FIG. 1 is a block diagram of an exemplary embodiment of a temperature sensor according to the present invention.

FIG. 1 illustrates an embodiment of a temperature sensor 100 according to the invention including a reference module 130, a resistor stack 140, an analog multiplexer 160, a comparator 170, and a controller 180.

The reference module 130 may create a reference current I2 (also referred to as a second current) and a reference voltage VD1. To generate the reference voltage VD1, a first diode D1 (also referred to as a P-N junction) may be connected in series with a first current source 110. While referred to as a diode in the description and drawings for clarity, the first diode D1 may be a variety of devices containing a P-N junction, such as, for example, a conventional diode, a Metal Oxide Semiconductor (MOS) device connected in a diode configuration (i.e., with the gate and drain connected together), and a bipolar junction transistor.

A forward biased P-N junction may exhibit a voltage drop across the P-N junction having an inverse correlation to temperature. In other words, as temperature increases, the voltage drop across a P-N junction decreases. This characteristic is illustrated by a graph of the reference voltage VD1 shown in the voltage versus temperature graphs of FIG. 4.

The reference module 130 may also generate the reference current I2 by using a voltage input 105 connected to a second current source 120. The voltage input 105 may be temperature compensated so that the first current I1 and the reference current I2 remain roughly constant as the temperature varies.

As shown in FIG. 1, the first current source 110 and the second current source 120 are implemented as p-channel transistors with the sources connected together and the gates of both current sources connected to the voltage input 105. As a result, the first current I1 and the second current I2 will be proportional to each other with the proportion depending on the size ratios between the two current sources (110 and 120). If the first current source 110 and the second current source 120 are substantially the same size, then the first current I1 and the second current I2 will be substantially the same. Additionally, the first current source 110 and the second current source 120 are shown in FIG. 1 as p-channel transistors for simplicity. However, other implementations for generating the first current I1 and reference current I2, such as, for example, series p-channel transistors, n-channel transistors, bipolar transistors, or temperature compensated current sources are possible and encompassed by the scope of the invention.

The resistor stack 140 may be implemented as a plurality of resistors connected in series with analysis signals (141, 142, 143, 144) between each of the resistors. In FIG. 1 a first resistor R1, a second resistor R2, a third resistor R3, and a fourth resistor R4 are shown as connected in series between the reference current I2 and a base signal 145.

The analysis signals (141, 142, 143, 144) provide for a set of analysis voltages derived from voltage drops across the resistor stack 140 when the reference current I2 is applied to the resistor stack 140. A first analysis signal 141, at the current reference side of the first resistor R1, generates a first analysis voltage VA1 substantially equal to the voltage drop across all the resistors in the resistor stack 140. A second analysis signal 142, at the current reference side of the second resistor R2, generates a second analysis voltage VA2 substantially equal to the voltage drop across all the resistors in the resistor stack 140 between the second connection point and the base signal 145 (i.e., the second resistor R2, the third resistor R3, and the fourth resistor R4). Similarly, a third analysis signal 143 generates a third analysis voltage VA3 including the voltage drop across the third resistor R3 and fourth resistor R4, and a fourth analysis signal 144 generates a fourth analysis voltage VA4 including the voltage drop across the fourth resistor R4.

The drawings illustrate the resistor stack 140 as containing four resistors in series. However, it will be readily apparent to a person of ordinary skill in the art that a large variety in number of resistors may be used in the resistor stack 140. Fewer resistors may result in less complexity, while more resistors may result in more precise temperature estimates due to smaller steps between analysis voltages.

A variable resistor 148 may be optionally connected in series between the base signal 145 and a ground voltage.

This variable resistor 148 may be used to adjust the analysis voltages, such that they may be calibrated to specific temperatures. Within the present invention, the variable resistor 148 may be embodied in a variety of methods. For example, the variable resistor 148 may be implemented as a set of small resistors, which may be connected together in a variety of options using programmable elements, such as, for example, Programmable Read Only Memory (PROM) cells, flash memory cells, fuses, and anti-fuses. The variable resistor 148 may also be configured as laser trimable resistors. Additionally, the variable resistor 148 may be incorporated into the last resistor in the stack (i.e., the fourth resistor R4 in the FIG. 1 embodiment).

While diodes may have an inverse correlation to temperature, a resistor may have a positive correlation to temperature in which the resistance of a resistor increases as temperature increases. In other words, as temperature increases, the voltage drop across a resistor increases. This characteristic is illustrated by a graph of the various analysis voltages shown in the voltage versus temperature graphs of FIG. 4.

The analog multiplexer 160 connects to each of the analysis signals (141, 142, 143, 144). A multiplexer control signal 185 operates to control which of the analysis signals (141, 142, 143, 144) is coupled to the multiplexer output 165. The multiplexer control signal 185 may comprise a group of control signals. For example, the group of control signals may include a signal to select each of the analysis signals (141, 142, 143, 144), or the group of control signals may include an encoding for which of the analysis signals (141, 142, 143, 144) to select. In an exemplary embodiment (not shown in the drawings), the analog multiplexer 160 may include a group of pass gates connected together on the multiplexer output 165 side of the pass gates. The other side of each pass gates may be connected to one of the analysis signals (141, 142, 143, 144) and each pass gate may be controlled by a signal from the multiplexer control signal 185.

The comparator 170 generates a comparison result 175 by comparing the multiplexer output 165 and the reference voltage VD1. The comparator 170 may be a simple voltage comparison generating a binary signal indicating whether the reference voltage VD1 is higher than or lower than the voltage on the multiplexer output 165.

The controller 180 selects the various analysis signals (141, 142, 143, 144) to operably couple to the multiplexer output 165 by controlling the multiplexer control signal 185. The controller 180 may step through comparisons of each of the analysis signals (141, 142, 143, 144) to arrive at a temperature estimate 189. The temperature estimate 189 may then be used by other circuits or modules (not shown) to modify their behavior based on the temperature estimate 189. The temperature estimate 189 may be configured as a group of signals indicating various temperature points where one of the signals is active at any given time indicating the current temperature estimate 189 (i.e., a "one hot" configuration). Alternatively, the temperature estimate 189 may be encoded into a group of signals indicating the temperature estimate 189, or may be configured as an analog signal indicating the temperature estimate 189.

Figure 4:
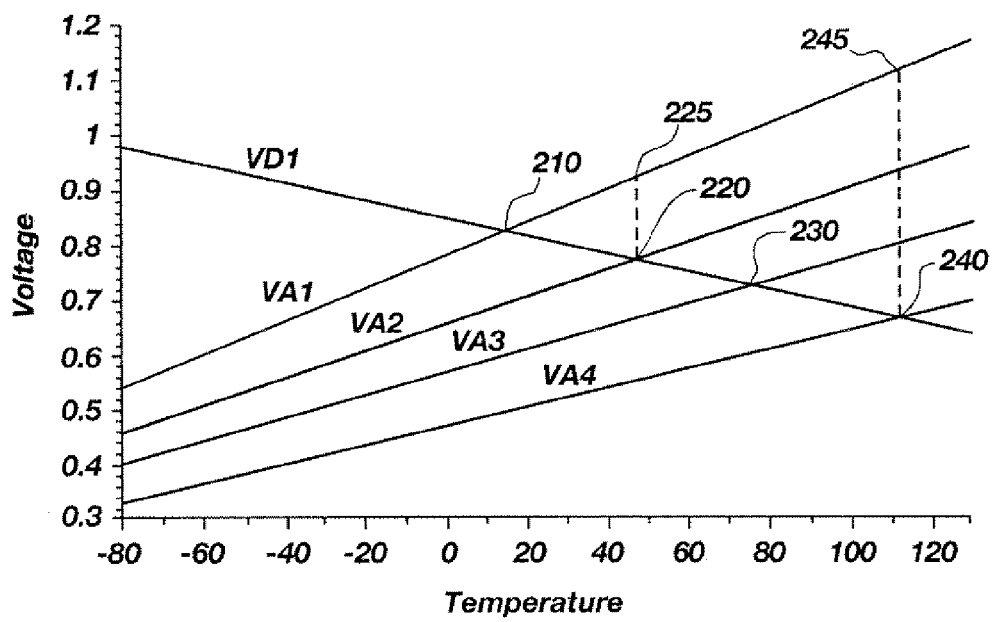
FIG. 4 is a graph of a reference voltage and various analysis voltages with no resistors of a resistor stack bypassed.

In operation, referring to FIGS. 1 and 4, the reference voltage VD1 exhibits a voltage inversely correlated to the temperature (shown as a negative slope in FIG. 4), while the analysis voltages exhibit voltages directly correlated to the temperature (shown as positive slopes in FIG. 4). Various trip points (also referred to as temperature approximations) are shown where the reference voltage VD1 crosses the analysis voltage. For example, in FIG. 4, a first trip point 210 occurs at a temperature of about 15° C., a second trip point 220 occurs at a temperature of about 45°C., a third trip point 230 occurs at a temperature of about 70°C., and a fourth trip point 240 occurs at a temperature of about 105°C. It will be readily apparent to a person of ordinary skill in the art that the number and location of trip points may be adjusted by modifying the number of resistors in the resistor stack 140 and modifying the resistance values of the resistors in the resistor stack 140 and the optional variable resistor 148.

Using these various trip points, the controller 180 may arrive at a temperature estimate 189 by comparing each of the analysis voltages to the reference voltage VD1. For example, when comparing the first analysis voltage VA1, if the first analysis voltage VA1 is less than the reference voltage VD1, then the temperature is less than the temperature at the first trip point 210. Similarly, if the first analysis voltage VA1 is greater than the reference voltage VD1, then the temperature is greater than the temperature at the first trip point 210. The controller 180 may perform this analysis for each of the analysis voltages to arrive at a temperature estimate 189.

For example, after performing the analysis described above, the controller 180 may determine that the temperature is between the second trip point 220 and third trip point 230 (i.e., between 45° C. and 70°C.). The controller 180 may use a simple rule to select the lower temperature point or the higher temperature point. The controller 180 may also use more complex rules, such as, for example, maintaining a history of temperatures to determine which trip point to use. The controller 180 may use the higher trip point if the temperature is falling and use the lower trip point if the temperature is rising.

Additionally, the comparator 170 may be a more complex comparator 170, which generates an analog signal as the comparison result 175 indicating the difference between the multiplexer output 165 and the reference voltage VD1. In this embodiment, the controller 180 may contain an analog-to-digital converter to sample the comparison result 175 and arrive at a temperature estimate 189 between the various trip points.

Figure 2:
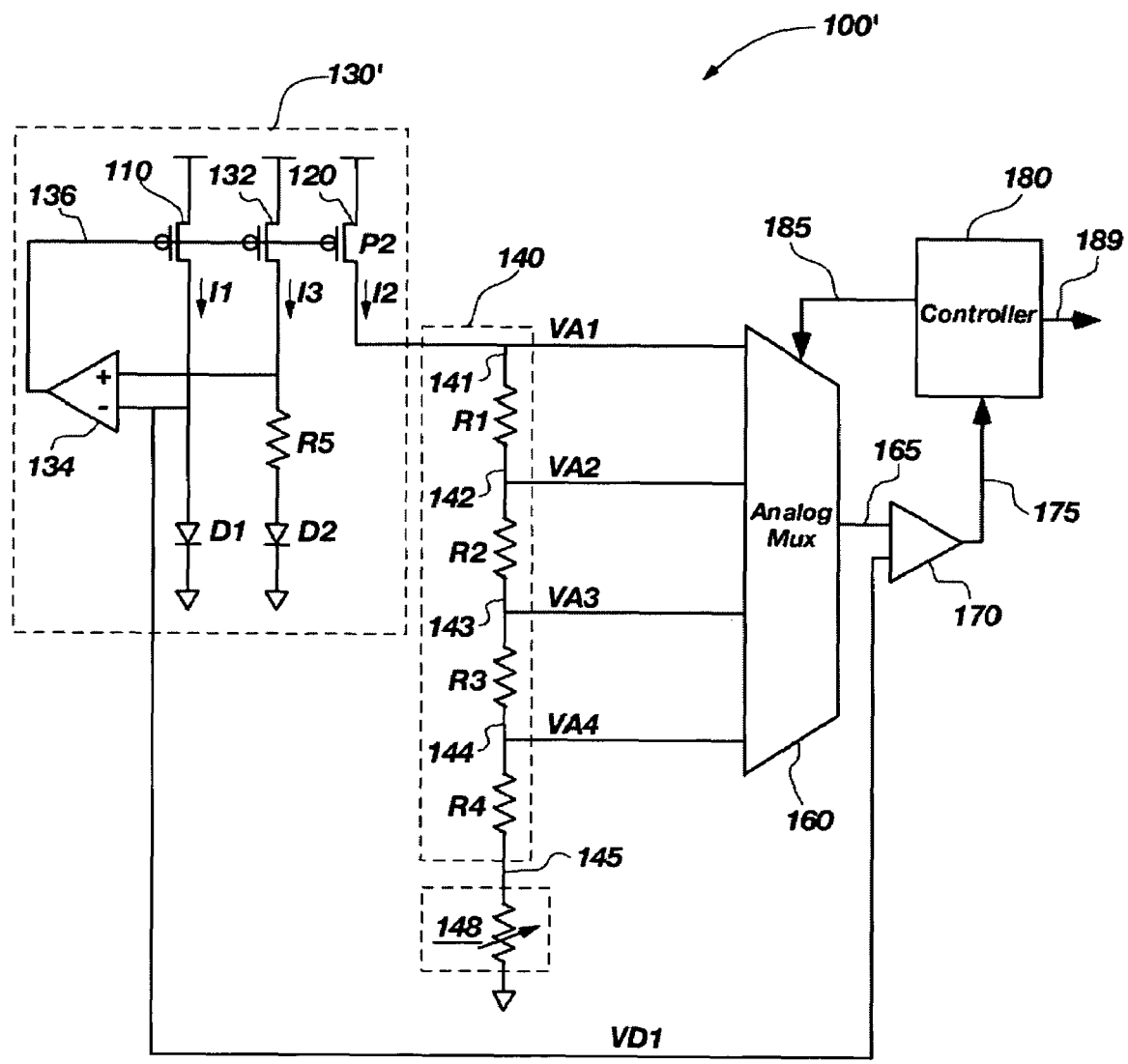
FIG. 2 is a block diagram of another exemplary embodiment of a temperature sensor according to the present invention including a bandgap reference circuit.

In another embodiment of the invention, as shown in FIG. 2, the temperature sensor 100' may include a reference module 130' configured as a bandgap current reference for generating the reference voltage VD1 and a temperature compensated reference current I2. Bandgap energy across a P-N junction varies in a predictable manner across temperature variations. A conventional bandgap reference uses these predictable variations to measure the bandgap voltage across a forward biased P-N junction. Historically, bandgap voltages were defined as the voltage from the base to emitter ($V_{be}$) of a bipolar junction transistor. However, a conventional diode may be used. Similarly, a Metal Oxide Semiconductor (MOS) device may be connected in a diode configuration (i.e., with the gate and drain connected together) to obtain the P-N junction. While the bandgap voltage may be obtained from a variety of devices in the various embodiments of the invention, suitable devices used to generate the bandgap voltage may be generally referred to as diodes and the forward biased voltage may be referred to using the historical $V_{be}$ nomenclature.

Generally, a bandgap reference is derived from the principal that two diodes of different sizes, but with the same emitter current, will have different current densities and, as a result, slightly different voltage drops across the P-N junction.

In a conventional bandgap current reference 130', as shown in FIG. 2, a first current source 110 connects in series with a forward biased first diode D1 and a third current source 132 connects in series with a fifth resistor R5 and a forward biased second diode D2. Generally, the second diode D2 is larger, such as, for example, eight times as large as the first diode D1, to create the slightly different voltage drops across the first diode D1 and the second diode D2. If the first and third current sources 110, 132 are set to generate the same amount of current, the voltage drop through the first diode D1 will equal the voltage drop across the combination of the second diode D2 and the fifth resistor R5. As a result, the voltage drop across the fifth resistor R5 represents the difference between the voltage drop across the first diode D1 and the voltage drop across the second diode D2. This difference may generally be referred to as $\Delta V_{be}$.

Due to the inverse temperature correlation for diodes, as temperature rises, the $V_{be}$ of the first diode D1 decreases at a higher rate than the $V_{be}$ decrease of the second diode D2. Consequently, the $\Delta V_{be}$ across the fifth resistor R5, which has a direct temperature correlation, increases with higher temperatures.

A conventional bandgap current reference 130' acts as a feedback control loop. In the steady state, the two inputs to an amplifier 134 are at approximately the same potential. If the inputs are not at the same potential, the amplifier 134 acts to reduce or increase the voltage on a feedback node 136. In turn, the voltage on the feedback node 136 will increase or decrease the current in the first current source 110 and the third current source 132. If the first current source 110 and the third current source 132 are implemented as p-channel devices of the same size, the first current I1 and third current I3 will be substantially equal and adjusted to a current amount that will cause the two inputs of the amplifier 134 to be at substantially the same potential.

The invention takes advantage of the already existing first diode D1, used in the bandgap current reference 130' to also act as a generator of the reference voltage VD1. Additionally, adding the second current source 120 as a p-channel transistor proportional to the first and third current sources 110, 132 with its gate connected to the feedback node 136 creates a stable reference current I2, which is roughly independent of temperature variations.

Figure 3:
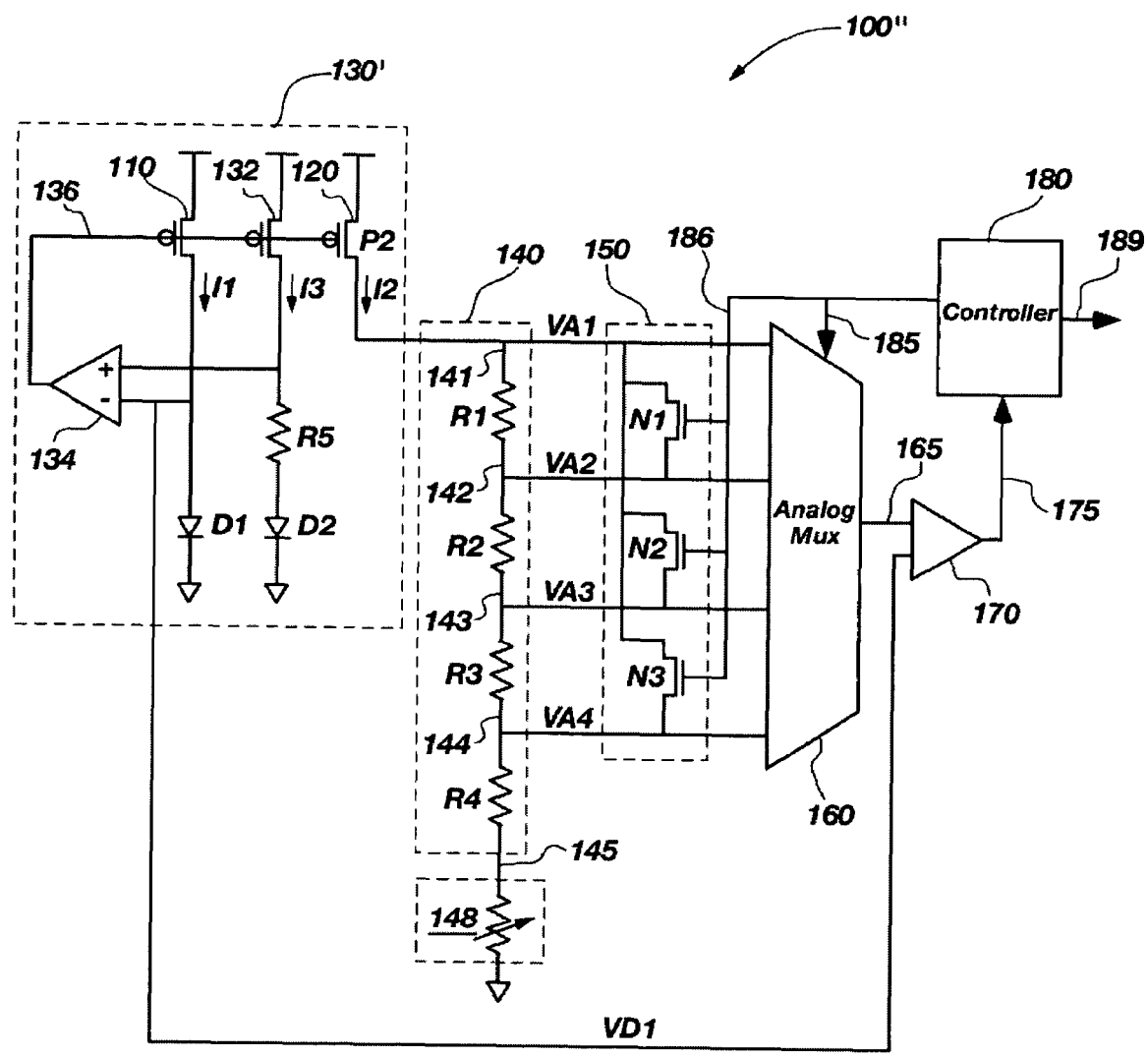
FIG. 3 is a block diagram of another exemplary embodiment of a temperature sensor according to the present invention including a bandgap reference circuit and a bypass module.

In another embodiment of the invention, as shown in FIG. 3, the temperature sensor 100" may include a bypass module 150. The bypass module 150 may be configured as a group of bypass elements configured in parallel with at least some of the resistors in the resistor stack 140. In the FIG. 3 embodiment, a first bypass element N1 is configured in parallel with the first resistor R1, effectively bypassing the first resistor R1 in the stack by coupling the reference current I2 to the second analysis signal 142. A second bypass element N2 is configured in parallel with the first and second resistor (R1, R2), effectively bypassing both resistors by coupling the reference current I2 to the third analysis signal 143. Finally, a third bypass element N3 is configured in parallel with the first, second, and third resistors (R1, R2, R3), effectively bypassing all three resistors by coupling the reference current I2 to the fourth analysis signal 144. While shown as n-channel transistors, it will be clear to a person of ordinary skill in the art that many other devices may be used as bypass elements, such as, for example, switches, and transmission gates comprised of p-channel and n-channel transistor in parallel.

The controller 180 uses a bypass control signal 186 to determine which bypass elements to enable. As with the multiplexer control signal 185, the bypass control signal 186 may be a group of signals configured in a variety of ways. Additionally, the bypass control signal 186 and the multiplexer control signal 185 may be configured as the same signal.

The maximum operational supply voltage needed for proper operation of a circuit is a concern as modern semiconductor devices are designed to operate at lower and lower voltages. At high temperature, when the voltage of the lowest point of the resistor stack 140 is being compared against the reference voltage VD1, the resistance of the entire stack is at its greatest. Hence, the voltage drop across the stack is at its greatest and, as a result, the maximum operational supply voltage needed is at its highest. The bypass module 150 provides a means for reducing the maximum operational supply voltage needed for the temperature sensor 100".

For proper operation of the embodiment shown in FIG. 3, and referring to FIGS. 3 and 4, the maximum operational supply voltage needed is determined as the drain to source voltage ($V_{DS}$) across the second current source 120 (to maintain the device in the saturation region) plus the voltage drop between the drain of the second current source 120 and ground (i.e., across the resistor stack 140). As can be seen from FIG. 4, the voltage drop across the resistor stack 140 at the first trip point 210 is about 0.82 volts. Assuming $V_{DS}$ is about 0.2 volts, the maximum operational supply voltage needed to detect 15° C. would be about 0.2+0.82=1.02 volts. However, as shown in FIG. 4, with none of the resistors bypassed, to detect a temperature of about 105° C., at the fourth trip point 240, requires the voltage as shown at voltage point 245 because each resistor in the stack contributes to the overall voltage drop. As a result, the maximum voltage at a temperature of about 105° C. would be about 0.2+1.05=1.25 volts. Bypassing some of the resistors in the stack can lower the maximum operational supply voltage needed at these higher temperatures.

Figure 5:
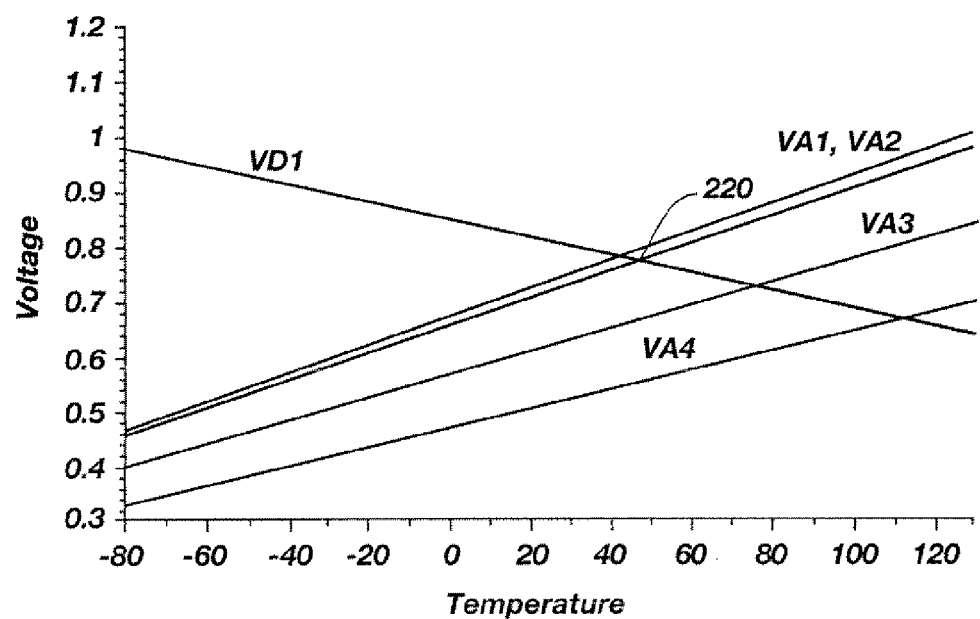
FIG. 5 is a graph of a reference voltage and various analysis voltages with one resistor of the resistor stack bypassed.

Referring to FIGS. 3 and 5, if the first bypass element N1 is enabled, then the first analysis voltage VA1 and the second analysis voltage VA2 will be substantially similar since the first resistor R1 is no longer participating in the voltage drop across the resistor stack 140. As a result, the maximum operational supply voltage needed to detect the second trip point 220 is about 0.2+0.75=0.95 volts, whereas, if the bypass module 150 is not used, the maximum operational supply voltage needed is about 0.2+0.92=1.12. The 0.92 volts refers to the voltage at the top of the stack when the first resistor R1 is not bypassed, as shown in FIG. 4 by voltage point 225.

Figure 6:
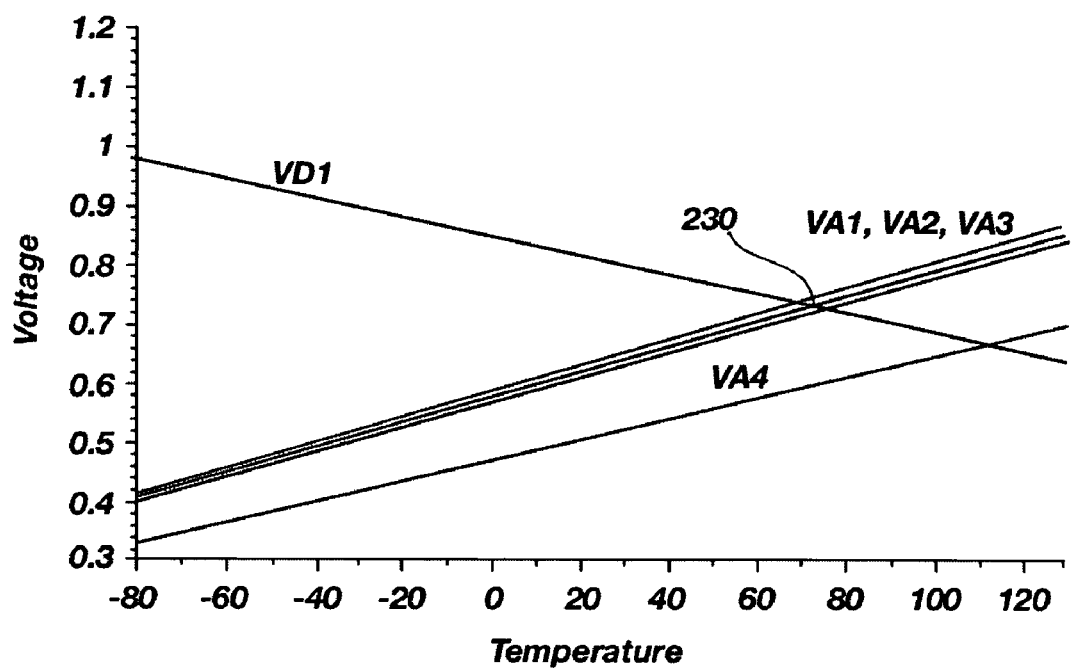
FIG. 6 is a graph of a reference voltage and various analysis voltages with two resistors of the resistor stack bypassed.

Referring to FIGS. 3 and 6, if the second bypass element N2 is enabled, then the first, second, and third analysis voltages (VA1, VA2, VA3) will be substantially similar since the first resistor R1 and second resistor R2 are no longer participating in the voltage drop across the resistor stack 140. As a result, the maximum operational supply voltage needed to detect the third trip point 230 is about 0.2+0.72=0.92 volts.

Figure 7:
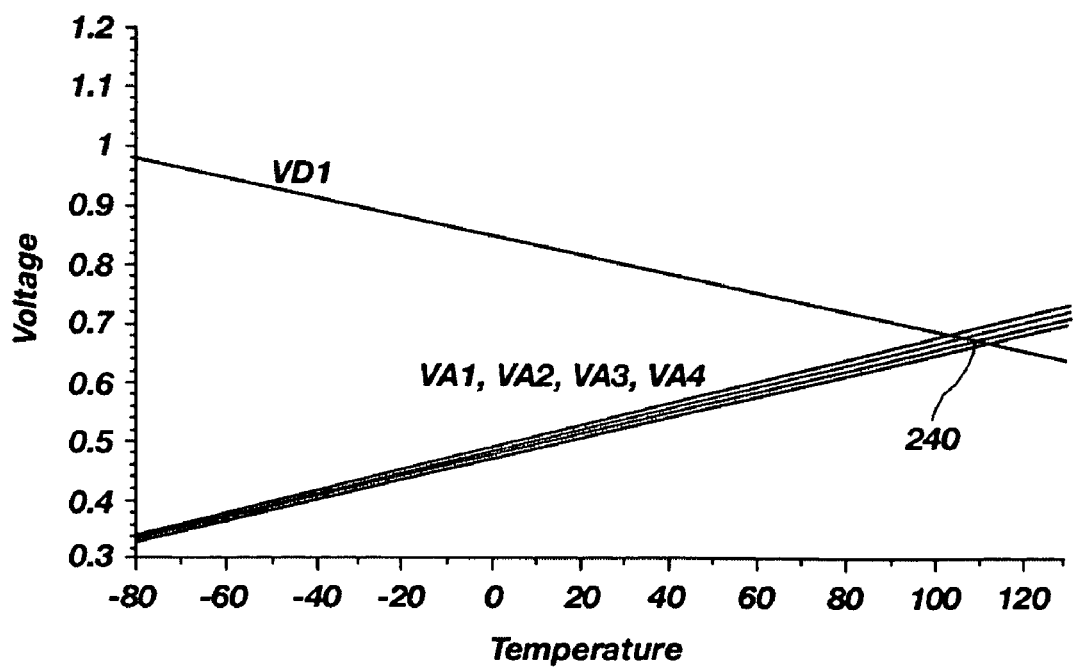
FIG. 7 is a graph of a reference voltage and various analysis voltages with three resistors of the resistor stack bypassed.

Referring to FIGS. 3 and 7, if the third bypass element N3 is enabled, then the first, second, third, and fourth analysis voltages (VA1, VA2, VA3, VA4) will be substantially similar since the first, second, and third resistors (R1, R2, R3) are no longer participating in the voltage drop across the resistor stack 140. As a result, the maximum operational supply voltage needed to detect the fourth trip point 240 is about 0.2+0.66=0.86 volts.

Figure 8:
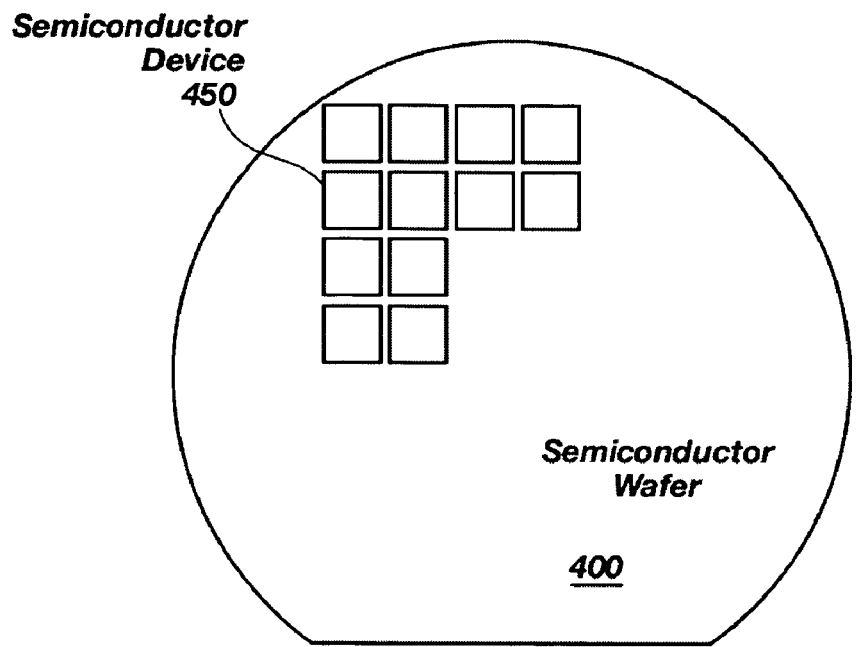
FIG. 8 is a schematic diagram of a semiconductor wafer including a plurality of semiconductor devices including a temperature sensor according to the present invention.

As shown in FIG. 8, a semiconductor wafer 400, in accordance with the present invention, includes a plurality of semiconductor devices 450 incorporating the temperature sensor (100, 100', or 100") (not shown in FIG. 8) described herein. Of course, it should be understood that the semiconductor devices 450 may be fabricated on substrates other than a silicon wafer, such as, for example, a Silicon On Insulator (SOI) substrate, a Silicon On Glass (SOG) substrate, or a Silicon On Sapphire (SOS) substrate, a gallium arsenide wafer, an indium phosphide wafer, or other bulk semiconductor substrate. As used herein, the term "wafer" includes and encompasses all such substrates.

Figure 9:
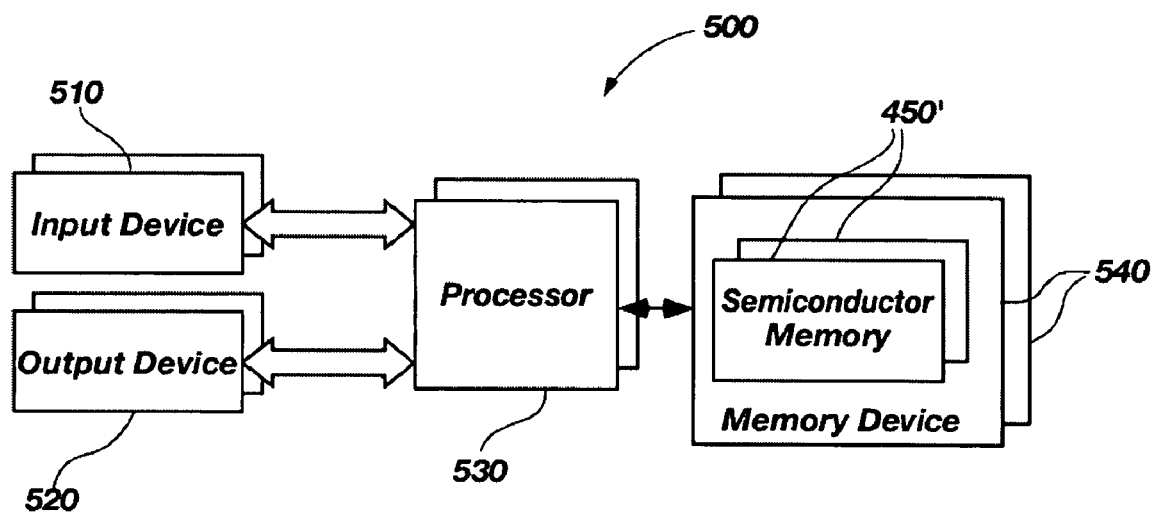
FIG. 9 is an electronic system diagram showing a plurality of semiconductor memories including a temperature sensor according to the present invention.

As shown in FIG. 9, an electronic system 500, in accordance with the present invention, comprises at least one input device 510, at least one output device 520, at least one processor 530, and at least one memory device 540. The memory device 540 comprises at least one semiconductor memory 450' incorporating the temperature sensor (100, 100', or 100") (not shown in FIG. 9) described herein in a DRAM device. It should be understood that the semiconductor memory 450' may comprise a wide variety of devices other than, or in addition to, a DRAM, including, for example, Static RAM (SRAM) devices, and Flash memory devices.

Although this invention has been described with reference to particular embodiments, the invention is not limited to these described embodiments. Rather, the invention is limited only by the appended claims, which include within their scope all equivalent devices or methods that operate according to the principles of the invention as described herein.

What is claimed is:

1. A temperature sensor, comprising:
    a reference module configured for generating a reference voltage inversely correlated to a temperature and a reference current correlated to the reference voltage;
    a plurality of resistors operably coupled in series between the reference current and a base signal operably coupled to a ground voltage;
    a plurality of analysis signals, each analysis signal of the plurality of analysis signals comprising a voltage drop across at least one of the plurality of resistors;
    an analog multiplexer configured for selectively operably coupling at least two of the plurality of analysis signals to a multiplexer output responsive to a multiplexer control signal;
    a comparator configured for comparing the multiplexer output to the reference voltage to generate a comparison result; and
    a controller configured for generating the multiplexer control signal and analyzing the comparison result from at least two of the plurality of analysis signals to generate a temperature estimate.

2. The temperature sensor of claim 1, wherein the reference module further comprises:
    a voltage input;
    a first current source operably coupled to the voltage input and the reference voltage and configured to generate the reference voltage from the voltage input; and
    a second current source operably coupled to the voltage input and the reference current and configured to generate the reference current from the voltage input.

3. The temperature sensor of claim 1, wherein the controller is further configured to generate a bypass control signal and the temperature sensor further comprises a bypass module for selectively bypassing at least one of the plurality of resistors in response to the bypass control signal.

4. The temperature sensor of claim 3, wherein the bypass module comprises a plurality of bypass elements, each bypass element of the plurality of bypass elements operably coupled in parallel with at least one corresponding resistor of the plurality of resistors and configured to bypass the at least one corresponding resistor when enabled by a signal from the bypass control signal.

5. The temperature sensor of claim 1, further comprising a variable resistor operably coupled between the ground voltage and the base signal and configured for adjusting a voltage of the base signal.

6. The temperature sensor of claim 1, wherein the controller comprises an analog-to-digital converter configured to sample the comparison result and generate the temperature estimate.

7. The temperature sensor of claim 1, wherein the comparator is further configured to generate an analog signal as the comparison result.

8. A method of sensing a temperature, comprising:
    generating a reference voltage inversely correlated to the temperature;
    generating a plurality of analysis voltages correlated to the temperature using a reference current correlated to the reference voltage to generate voltage drops across a plurality of resistors operably coupled in series;
    selecting at least two of the plurality of analysis voltages;
    comparing the reference voltage to each of the at least two of the plurality of analysis voltages; and
    generating a temperature estimate based on the comparisons from the at least two of the plurality of analysis signals.

9. The method of claim 8, further comprising:
    generating the reference voltage from a first current source operably coupled to a voltage input; and
    generating the reference current from a second current source operably coupled to the voltage input.

10. The method of claim 8, wherein generating the plurality of analysis voltages is performed by the plurality of resistors operably coupled in series between the reference current and a base signal operably coupled to a ground voltage, each analysis voltage of the plurality of analysis voltages generated by a voltage drop across at least one of the plurality of resistors.

11. The method of claim 10, further comprising selectively bypassing at least one of the plurality of resistors.

12. The method of claim 11, wherein selectively bypassing is performed by a plurality of bypass elements, each of the plurality of bypass elements operably coupled in parallel with at least one corresponding resistor of the plurality of resistors and configured to bypass the at least one corresponding resistor when enabled by a bypass control signal.

13. The method of claim 8, wherein comparing the reference voltage generates a comparison result based on whether the reference voltage is higher or lower than each of the plurality of analysis voltages.

14. The method of claim 8, wherein generating the temperature estimate further comprises selecting a temperature approximation as the temperature estimate, wherein the temperature approximation is correlated to an analysis voltage of the plurality of analysis voltages that is above and closest to the reference voltage.

15. The method of claim 8, wherein generating the temperature estimate further comprises selecting a temperature approximation as the temperature estimate, wherein the temperature approximation is correlated to an analysis voltage of the plurality of analysis voltages that is below and closest to the reference voltage.

16. A semiconductor memory device, comprising:
    a reference module configured for generating a reference voltage inversely correlated to a temperature and a reference current correlated to the reference voltage;

a plurality of resistors operably coupled in series between the reference current and a base signal operably coupled to a ground voltage;

a plurality of analysis signals, each analysis signal of the plurality of analysis signals comprising a voltage drop across at least one of the plurality of resistors;

an analog multiplexer configured for selectively operably coupling at least two of the plurality of analysis signals to a multiplexer output responsive to a multiplexer control signal;

a comparator configured for comparing the multiplexer output to the reference voltage to generate a comparison result; and a controller configured for generating the multiplexer control signal and analyzing the comparison result from at least two of the plurality of analysis signals to generate a temperature estimate.

17. The semiconductor memory device of claim 16, wherein the reference module further comprises:
a voltage input;
a first current source operably coupled to the voltage input and the reference voltage and configured to generate the reference voltage from the voltage input; and
a second current source operably coupled to the voltage input and the reference current and configured to generate the reference current from the voltage input.

18. The semiconductor memory device of claim 16, wherein the controller is further configured to generate a bypass control signal and the temperature sensor further comprises a bypass module for selectively bypassing at least one of the plurality of resistors in response to the bypass control signal.

19. The semiconductor memory device of claim 18, wherein the bypass module comprises a plurality of bypass elements, each bypass element of the plurality of bypass elements operably coupled in parallel with at least one corresponding resistor of the plurality of resistors and configured to bypass the at least one corresponding resistor when enabled by a signal from the bypass control signal.

20. The semiconductor memory device of claim 16, further comprising a variable resistor operably coupled between the ground voltage and the base signal and configured for adjusting a voltage of the base signal.

21. The semiconductor memory device of claim 16, wherein the controller comprises an analog-to-digital converter configured to sample the comparison result and generate the temperature estimate.

22. The semiconductor memory device of claim 16, wherein the comparator is further configured to generate an analog signal as the comparison result.

23. An electronic system, comprising:
at least one input device;
at least one output device;
at least one processor; and
at least one memory device, comprising at least one semiconductor memory including at least one temperature sensor, the at least one temperature sensor comprising:

a reference module configured for generating a reference voltage inversely correlated to a temperature and a reference current correlated to the reference voltage;

a plurality of resistors operably coupled in series between the reference current and a base signal operably coupled to a ground voltage;

a plurality of analysis signals, each analysis signal of the plurality of analysis signals comprising a voltage drop across at least one of the plurality of resistors;

an analog multiplexer configured for selectively operably coupling at least two of the plurality of analysis signals to a multiplexer output responsive to a multiplexer control signal;

a comparator configured for comparing the multiplexer output to the reference voltage to generate a comparison result; and a controller configured for generating the multiplexer control signal and analyzing the comparison result from at least two of the plurality of analysis signals to generate a temperature estimate.

24. The electronic system of claim 23, wherein the reference module further comprises:
a voltage input;
a first current source operably coupled to the voltage input and the reference voltage and configured to generate the reference voltage from the voltage input; and
a second current source operably coupled to the voltage input and the reference current and configured to generate the reference current from the voltage input.

25. The electronic system of claim 23, wherein the controller is further configured to generate a bypass control signal and the at least one temperature sensor further comprises a bypass module for selectively bypassing at least one of the plurality of resistors in response to the bypass control signal.

26. The electronic system of claim 25, wherein the bypass module comprises a plurality of bypass elements, each bypass element of the plurality of bypass elements operably coupled in parallel with at least one corresponding resistor of the plurality of resistors and configured to bypass the at least one corresponding resistor when enabled by a signal from the bypass control signal.

27. The electronic system of claim 23, further comprising a variable resistor operably coupled between the ground voltage and the base signal and configured for adjusting a voltage of the base signal.

28. The electronic system of claim 23, wherein the controller comprises an analog-to-digital converter configured to sample the comparison result and generate the temperature estimate.

29. The electronic system of claim 23, wherein the comparator is further configured to generate an analog signal as the comparison result.

* * * * *